United States Patent [19]
Kohiyama

[11] Patent Number: 5,867,219
[45] Date of Patent: Feb. 2, 1999

[54] IMAGE PROCESSING DEVICE USING HIGH FREQUENCY COMPONENT SUPPRESSION

[75] Inventor: Kiyoshi Kohiyama, Kawasaki, Japan

[73] Assignee: Fujitsu Limited, Kawasaki, Japan

[21] Appl. No.: 763,795

[22] Filed: Dec. 11, 1996

[30] Foreign Application Priority Data

Sep. 5, 1996 [JP] Japan .................................. 8-235505

[51] Int. Cl.⁶ .................................................. H04N 7/30
[52] U.S. Cl. .......................................... 348/400; 348/415
[58] Field of Search .................................. 348/416, 415, 348/409, 403, 402, 401, 400, 397, 390, 384; 382/233, 238, 236, 232; H04N 7/137

[56] References Cited

U.S. PATENT DOCUMENTS

| | | | |
|---|---|---|---|
| 4,630,110 | 12/1986 | Cotton | 348/153 |
| 5,371,549 | 12/1994 | Park | 348/402 |
| 5,382,972 | 1/1995 | Kannes | 348/15 |
| 5,452,103 | 9/1995 | Brusewitz | 348/419 |

*Primary Examiner*—Bryan Tung
*Attorney, Agent, or Firm*—Staas & Halsey

[57] ABSTRACT

An image processing device which receives digital image data compressed in a form of frequency components and applies signal processing to the digital image data is disclosed. The image processing device includes a frequency-component extracting unit extracting the frequency components from the digital image data compressed in a form of the frequency components, a high-frequency suppressing unit suppressing the frequency components if the frequency components are higher than a predetermined frequency, a transformation unit transforming the digital image data from a frequency domain into a spatial domain to produce spatial-domain images, and a decimating unit decimating pixels of the spatial-domain images at a predetermined decimation rate to generate size-reduced images.

14 Claims, 7 Drawing Sheets

F I G. 4

|   | 1 | 2 | 3 | 4 | 5 | 6 | 7 | 8 |
|---|---|---|---|---|---|---|---|---|
| 1 | ● | ● | ● | ● | ○ | ○ | ○ | ○ |
| 2 | ● | ● | ● | ● | ○ | ○ | ○ | ○ |
| 3 | ● | ● | ● | ● | ○ | ○ | ○ | ○ |
| 4 | ● | ● | ● | ● | ○ | ○ | ○ | ○ |
| 5 | ○ | ○ | ○ | ○ | ○ | ○ | ○ | ○ |
| 6 | ○ | ○ | ○ | ○ | ○ | ○ | ○ | ○ |
| 7 | ○ | ○ | ○ | ○ | ○ | ○ | ○ | ○ |
| 8 | ○ | ○ | ○ | ○ | ○ | ○ | ○ | ○ |

IMAGE PROCESSING DEVICE USING HIGH FREQUENCY COMPONENT SUPPRESSION

BACKGROUND OF THE INVENTION

1. Field of the Invention

The present invention generally relates to image processing devices, and particularly relates to an image processing device which decodes moving pictures digitally compressed through such schemes as MPEG (moving picture expert group).

Broadcasting based on MPEG-digital-compression techniques such as digital-satellite broadcasting has been making market progress in recent years. The digital-compression techniques enable an efficient use of spectrum space for broadcasting, and viewers are given free choices of favorite programs from hundreds of channels. In making choices of favorite programs, viewers would prefer having a chance to take a look at aired programs simultaneously and compare them, rather than relying on printed program information such as a TV guide. To render such services to the viewers, a plurality of programs should be displayed on a TV screen in a form of multi-windows after a size reduction of each program picture. The present invention relates to a circuit which produces such a multi-window display image by drawing on functions of MPEG decoders.

2. Description of the Related Art

FIG. 1 is a block diagram of a related-art image processing device which receives moving pictures digitally compressed through MPEG and shows the moving pictures on a display. The image processing device of FIG. 1 includes an input buffer 10, a variable-length-decoding unit 11, an inverse-quantization unit 12, an inverse-DCT (discrete cosine transform) unit 13, an adder 14, a prediction unit 15, a memory controller 16, an MPEG-decoding-purpose memory 17, an output circuit 18, a display 19, an output circuit 20, a low-pass filter 21, a decimating circuit 22, a multi-window memory 23, a multi-window-control unit 24, and a bus 30. The MPEG-decoding-purpose memory 17 includes a VBV buffer 17-1, an I/P-picture buffer 17-2, a I/P-picture buffer 17-3, and a B-picture buffer 17-4. Here, MPEG-digitally-compressed-image information refers to image information which is compressed in accordance with the MPEG-international-image-compression standard. This standard employs variable-length coding for representing frequently appearing symbols by short codes and rarely appearing symbols by long codes to reduce the number of bits in a decoded code sequence. It also employs DCT for transforming an image into spatial frequency components representing vertical frequencies and horizontal frequencies of the image, quantization for quantizing the DCT coefficients by using bits in a commensurate number with image characteristics, DPCM (differential pulse code modulation) for transmitting a differential image between a current image and a previous image to reduce the amount of image information, etc.

The input buffer 10 latches the MPEG-digitally-compressed-image information. The latched image information is supplied to and temporarily stored in the VBV buffer 17-1 of the MPEG-decoding-purpose memory 17 via the bus 30 and the memory controller 16. In the MPEG standard, compressed image information has different numbers of bits allocated to different frames. Namely, some frames are represented by a relatively small number of bits, and other frames are represented by a relatively large number of bits. Since image information having different numbers of bits in different frames is transmitted at a constant bit rate (transmission rate), the input buffer 10 receives image information by spending different lengths of time for different frames. The VBV buffer 17-1 is provided for a purpose of absorbing this variation in the frame transmission time. The VBV buffer 17-1 receives the image information from the input buffer 10 when the input buffer 10 receives this image information at a constant transmission rate. The VBV buffer 17-1 then temporarily stores the image information to absorb the variation in the frame transmission time. Each frame of the image information stored in the VBV buffer 17-1 is read each time the display 19 displays one frame, and is subjected to a subsequent decoding process. International standards set forth that the number of bits stored in the VBV buffer 17-1 should be managed so as not to cause overflow or underflow of the buffer. The storage capacity of the VBV buffer 17-1 is also defined by the international standards.

Images stored in the VBV buffer 17-1 are supplied to the variable-length-decoding unit 11 via the memory controller 16 and the bus 30. The variable-length-decoding unit 11 decodes variable-length codes into fixed-length codes, and, also, extracts motion vectors, quantized DCT coefficients, etc. The inverse-quantization unit 12 receives the quantized DCT coefficients, and applies inverse-quantization to produce DCT coefficients. The inverse-DCT unit 13 receives the DCT coefficients, and applies inverse DCT to convert the image information from the frequency domain to the spatial domain.

Coding on the sender side and decoding (image reconstruction) on the receiver side are carried out for each block of an image after dividing the image into a plurality of blocks each having 16×16 pixels. This block is called a macro block. Motion vectors between images are also obtained for each macro block. Each macro block is further divided into smaller blocks of 8×8 pixels, and DCT on the sender side and inverse DCT on the receiver side are applied to each one of these smaller blocks.

MPEG-digital-image compression produces three types of coded pictures. These three types are I (intra) pictures, P (predictive) pictures, and B (bidirectionally predictive) pictures. The I pictures are obtained by applying predictive coding within a current frame. The P pictures are obtained by effecting predictive coding of a current frame by generating a differential image between the current frame and a reference frame with help of a motion vector, after obtaining the motion vector between the current frame and a previous frame serving as the reference frame. The B pictures are obtained by effecting predictive coding of a current frame by generating a differential image between the current frame and two reference frames based on motion vectors, which are detected between the current frame and the two reference frames, one in the future and the other in the past.

The past reference frame is an I picture or a a P picture in the past, and the future reference frame is a P picture in the future. When coding a B picture, a future P picture to serve as the future reference frame is coded and transmitted before this B picture is coded and transmitted. The receiver (decoder) side decodes the B picture by using a past I or P picture and the future P picture which has been received in advance. Such a decoding process is carried out based on motion vectors, and the prediction unit 15 controls the decoding process.

In the case of decoding an I picture, the adder 14 passes the image information from the inverse-DCT unit 13 without making any change to the image information. The I picture passing through the adder 14 is stored in the I/P-picture buffer 17-2 of the MPEG-decoding-purpose memory 17 via the bus 30 and the memory controller 16. The I picture stored in the I/P-picture buffer 17-2 is subsequently used for reconstructing a following P or B picture. For the purpose of display, the I picture is also supplied to the output circuit 20 via the bus 30.

In the case of decoding a P picture, a current frame (P picture) stored in the VBV buffer 17-1 is read by the variable-length-decoding unit 11, and, then, supplied to the adder 14 via the inverse-quantization unit 12 and the inverse-DCT unit 13. Each block of the current frame represents differentials from a corresponding block of a past reference frame. The past reference frame (P picture or I picture) has been already decoded, and is stored in the I/P-picture buffer 17-2 or the I/P-picture buffer 17-3. Motion vectors detected by the variable-length-decoding unit 11 are supplied to the prediction unit 15, which then fetches the past reference frame via the memory controller 16 and the bus 30. Based on the motion vectors, the prediction unit 15 provides the adder 14 with a block of the past reference frame corresponding to a given block of the current frame. The adder 14 adds each block of the current frame to a corresponding block of the past reference frame to reconstruct an image of the current frame. The reconstructed P picture is then stored in the I/P-picture buffer 17-2 or the I/P-picture buffer 17-3. The stored P picture is subsequently used for reconstructing a following P or B picture. For the purpose of display, the P picture is also supplied to the output circuit 20 via the bus 30.

In the case of decoding a B picture, a current frame (B picture) stored in the VBV buffer 17-1 is read by the variable-length-decoding unit 11, and, then, is supplied to the adder 14 via the inverse-quantization unit 12 and the inverse-DCT unit 13. Each block of the current frame represents differentials from a corresponding block of a past reference frame and a corresponding block of a future reference frame. The past reference frame (P picture or I picture) and the future reference frame (P picture or I picture) have been already decoded, and are stored in the I/P-picture buffer 17-2 or the I/P-picture buffer 17-3. Motion vectors detected by the variable-length-decoding unit 11 are supplied to the prediction unit 15, which then fetches the past reference frame and the future reference frame via the memory controller 16 and the bus 30. Based on the motion vectors, the prediction unit 15 provides the adder 14 with a block of the past reference frame and a block of the future reference frame corresponding to a given block of the current frame. The adder 14 adds each block of the current frame to corresponding blocks of the past and future reference frames to reconstruct an image of the current frame. The reconstructed B picture is then supplied to the output circuit 20 via the bus 30 for display of the image. The B-picture buffer 17-4 is used for storing an image in process of decoding.

In general, I pictures are transmitted once every 0.5 seconds (i.e., at a rate of one frame in every 15 frames). I pictures generally have the lowest compression rate and require the largest amount of information (the largest number of bits) for representing images, compared to P pictures and B pictures, although the compression rate and the information amount depend on inter-frame correlation in a time dimension. B pictures have the highest compression rate and require the smallest amount of information (the smallest number of bits) for representing images. P pictures have a compression rate higher than that of the I pictures and lower than that of B pictures.

Distinction of I/P/B pictures is made by the variable-length-decoding unit 11 extracting picture headers from a MPEG data stream and looking into the following portion of the data stream.

In FIG. 1, the low-pass filter 21, decimating circuit 22, the multi-window memory 23, and multi-window-control unit 24 are provided to implement multi-window-screen display or size-reduced-picture display. The multi-window-screen display, for example, shows pictures of a number of channels on a screen after size reductions of each picture, so that viewers can select a channel broadcasting a program matching with their tastes. The size-reduced-picture display shows broadcasted pictures of a given channel (program) on a screen after reducing the size of the pictures, using a remaining space of the screen for displaying relevant information on the program contents. Such multi-window-screen display or size-reduced-picture display requires decimation of image pixels to produce a size-reduced image. A simple decimation of image pixels, however, results in aliasing noise. This aliasing noise is created when high-frequency components of an image are turned into corresponding low-frequency components due to longer sampling intervals resulting from the decimation of pixels, and is a well-known noise in the field of the signal processing. In order to avoid the aliasing noise, high-frequency components are typically removed from the image prior to the pixel decimation.

The low-pass filter 21 of FIG. 1 removes high-frequency components of images to prevent aliasing noise. FIGS. 2A through 2C are block diagrams of examples of digital filters which are used as the low-pass filter 21. These digital filters include delay elements 31 through 36 and adders 41 through 44. Removing high-frequency components by use of such digital filters can prevent aliasing noise from generating even when pixels are decimated. The images with high-frequency components thereof being cut by the low-pass filter 21 are supplied to the decimating circuit 22. The decimating circuit 22 extracts every other pixel of the supplied images, for example, so as to generate size-reduced images having a quarter of the original size (half size in a vertical direction and half size in a horizontal direction).

The multi-window-control unit 24 feeds image-writing addresses to the multi-window memory 23 so that the images from the decimating circuit 22 are written at specified addresses. In the case of the multi-window-screen display, size-reduced images are written into the multi-window memory 23 successively at different addresses corresponding to screen positions of the size-reduced images. When reading the images, the multi-window-control unit 24 supplies reading addresses to the multi-window memory 23. The screen information stored in the multi-window memory 23 is then read in a raster scanning manner to be supplied to the output circuit 18. This screen information is shown on the display 19. The multi-window-screen display or the size-reduced-picture display is implemented in this manner.

The image processing device of FIG. 1 has a problem in that despite the presence of the MPEG-decoding-purpose memory 17, another frame memory (multi-window memory 23) becomes necessary. In the manufacturing of image processing devices, it is preferable to make all parts of an image processing device on one chip. Since the configuration of FIG. 1 requires additional frame memory, the multi-window memory 23, the multi-window-control unit 24, etc., are to be implemented on a separate chip from the chip bearing an MPEG-decoding unit, which comprises the variable-length-decoding unit 11, the inverse-quantization unit 12, the inverse-DCT unit 13, the adder 14, the prediction unit 15, the memory controller 16, and the MPEG-decoding-purpose memory 17.

Another problem of the image processing device of FIG. 1 is the need for providing the low-pass filter 21 for the removal of high-frequency components. The low-pass filter 21 is used for applying frequency-domain signal processing to a decoded image in the spatial domain, although the MPEG images were transmitted in a form of frequency components after these images had been transformed into the frequency domain. The manner in which this signal processing is carried out is thus redundant. Further, low-pass filtering in a vertical direction of the image (direction perpendicular to the scanning direction of the image) requires digital filters of a large circuit size. In the low-pass filtering in the scanning (horizontal) direction of the image, the delay elements 31 through 36 of the digital filters in FIGS. 2A through 2C can be a register with a storage capacity of only one pixel, so that the circuit size tends to be small. In the low-pass filtering in the vertical direction of the image, however, the delay elements 31 through 36 need to be a line memory with a storage capacity for storing pixels of one scan line. This requires a large circuit size of the digital filters.

Accordingly, there is a need in the size-reduced-picture display of compressed digital images for a device and a method which can generate a size-reduced image through decimation of pixels with efficient use of memories and efficient processing of image data.

SUMMARY OF THE INVENTION

Accordingly, it is a general object of the present invention to provide a device and a method which can satisfy the need described above.

It is another and more specific object of the present invention to provide a device and a method which can generate a size-reduced image through decimation of pixels with efficient use of memories and efficient processing of image data.

In order to achieve the above objects according to the present invention, an image processing device which receives digital image data compressed in a form of frequency components and applies signal processing to the digital image data is disclosed. The image processing device includes a frequency-component extracting unit extracting the frequency components from the digital image data compressed in a form of the frequency components, a high-frequency suppressing unit suppressing the frequency components if the frequency components are higher than a predetermined frequency, a transformation unit transforming the digital image data from a frequency domain into a spatial domain to produce spatial-domain images, and a decimating unit decimating pixels of the spatial-domain images at a predetermined decimation rate to generate size-reduced images.

The same objects are achieved according to the present invention by a method of generating size-reduced images in an image processing device which receives digital image data compressed in a form of frequency components and applies signal processing to the digital image data. The method includes the steps of extracting the frequency components from the digital image data compressed in a form of the frequency components, partly or completely suppressing the frequency components if the frequency components are higher than a predetermined frequency, c) transforming the digital image data from a frequency domain to a spatial domain to produce spatial-domain images, and d) decimating pixels of the spatial-domain images at a predetermined decimation rate to generate size-reduced images.

The device and method described above suppress high-frequency components of the digital image data which is provided in a form of the frequency components when the high-frequency components have frequencies higher than the predetermined frequency, and decimate pixels of images after the images are transformed into the spatial domain to generate size-reduced images. Because of the suppression of the high-frequency components, the size-reduced images are free from or have reduced aliasing noise. Also, since the partial or complete suppression of the high-frequency components takes place in the frequency domain prior to the transformation into the spatial domain, the process of generating size-reduced images is efficient.

Further, a memory area used for storing I pictures, P pictures, and B pictures in a normal operation can be used for storing the size-reduced images by extracting the frequency components of only the I pictures in a mode for displaying size-reduced images. An efficient use of memory space is thus achieved.

Other objects and further features of the present invention will be apparent from the following detailed description when read in conjunction with the accompanying drawings.

BRIEF DESCRIPTION OF THE DRAWINGS

FIG. 4 is an illustrative drawing showing an example of quantized DCT coefficients some of which are replaced by zero values;

DETAILED DESCRIPTION OF THE PREFERRED EMBODIMENTS

In the following, an embodiment of the present invention will be described with reference to accompanying drawings.

Figure 1:
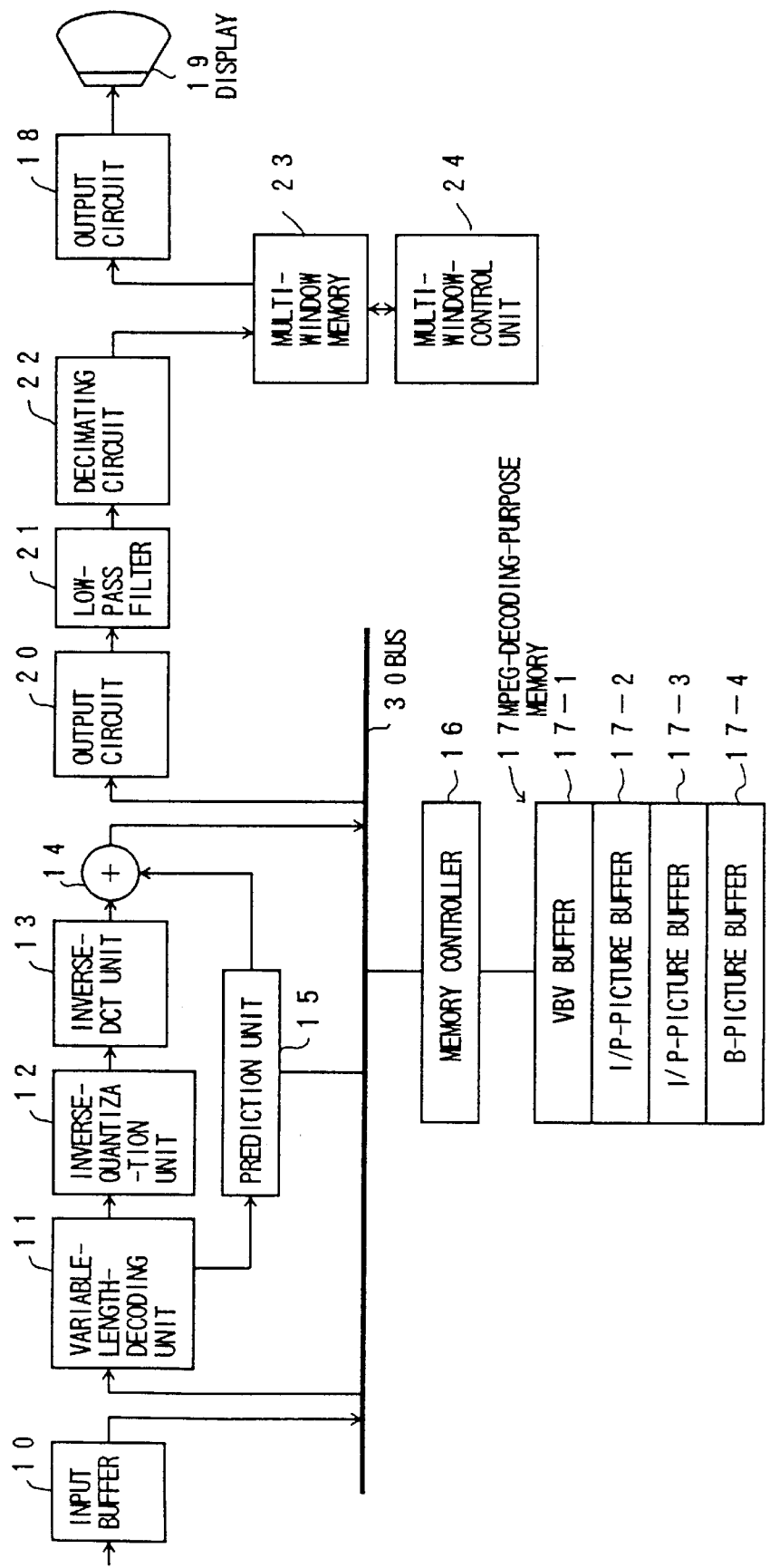
FIG. 1 is a block diagram of a related-art image processing device which receives moving pictures digitally compressed through MPEG and shows the moving pictures on a display.
Figure 2A:
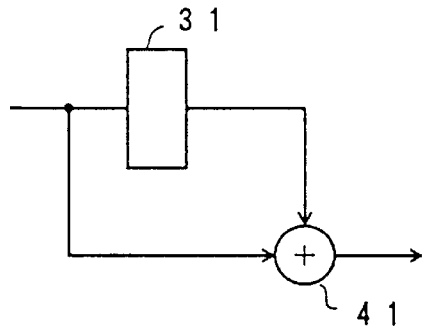
FIGS. 2A through 2C are block diagrams of examples of digital filters which are used as the low-pass filter of FIG. 1.
Figure 2B:
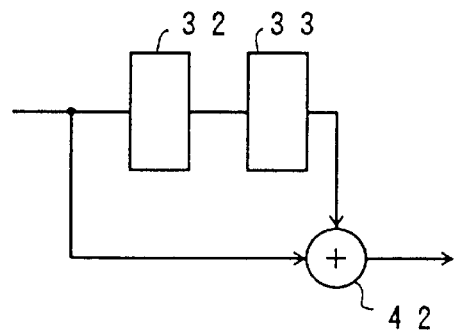
Figure 2C:
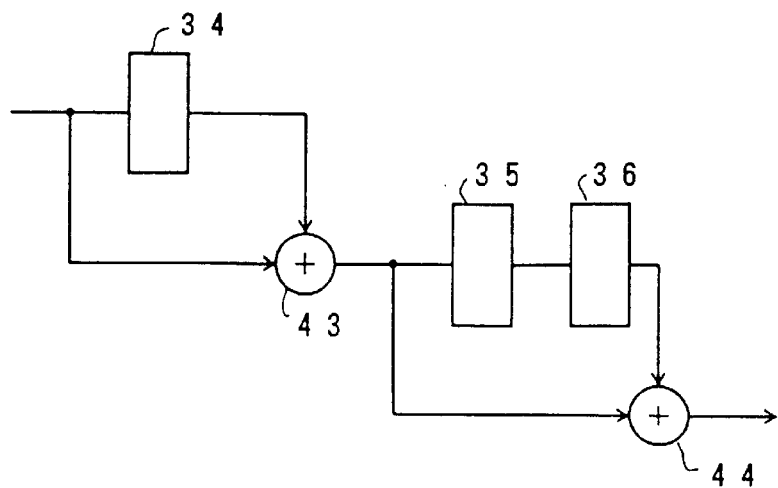
Figure 3:
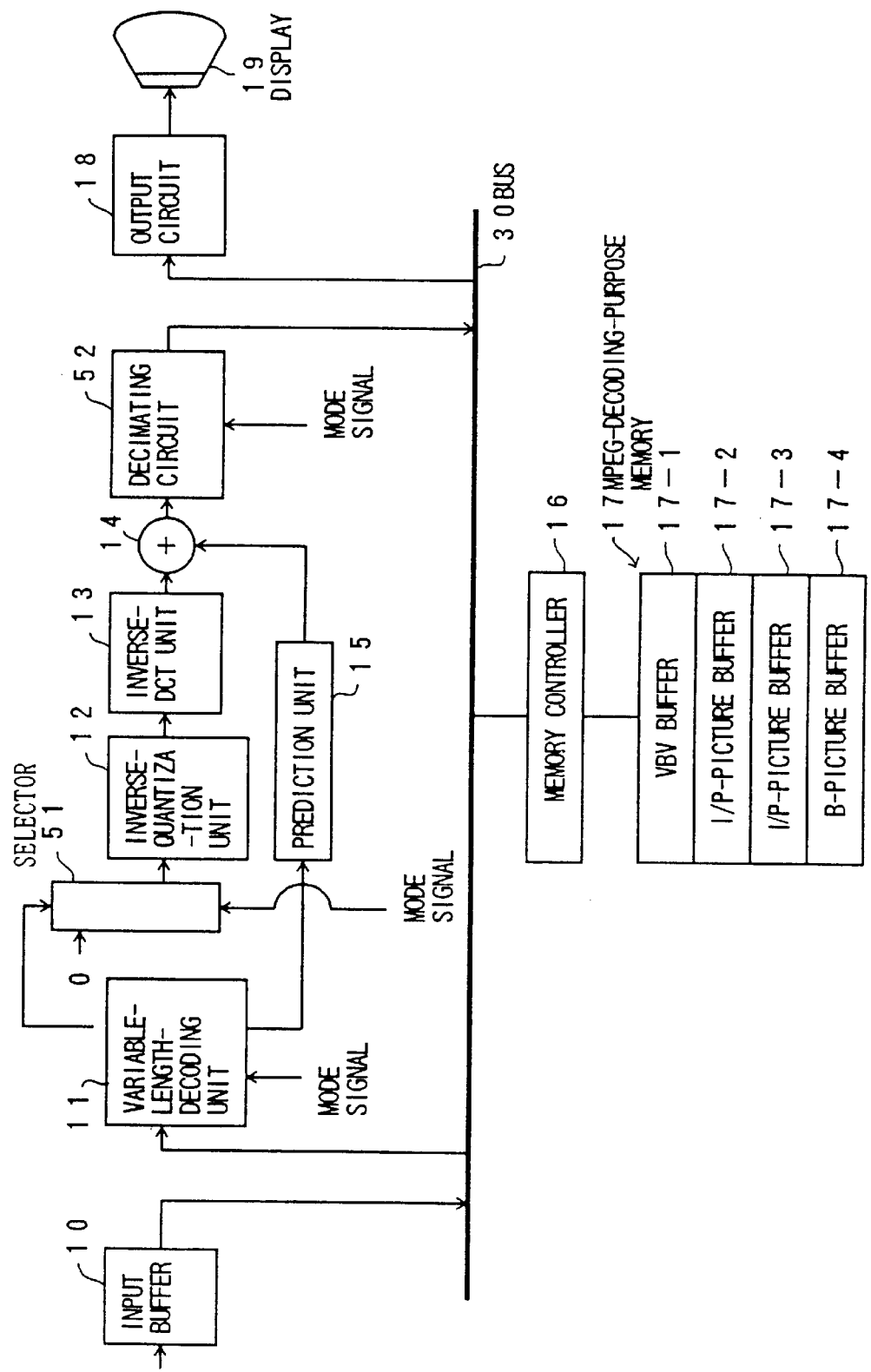
FIG. 3 is a block diagram of an embodiment of an image processing device according to the present invention.

FIG. 3 is a block diagram of an embodiment of an image processing device according to the present invention. In FIG. 3, the same elements as those of FIG. 1 are referred to by the same numerals, and a description thereof will be omitted.

The input buffer 10 latches the MPEG-digitally-compressed-image information transmitted to the image processing device. The latched image information is supplied to and temporarily stored in the VBV buffer 17-1 of the MPEG-decoding-purpose memory 17 via the bus 30 and the memory controller 16. The images stored in the VBV buffer 17-1 are read by the variable-length-decoding unit 11 via the bus 30 and the memory controller 16. The variable-length-decoding unit 11 carries out inverse coding to convert variable-length codes into fixed-length codes, and detects motion vectors, quantized DCT coefficients, etc.

A selector 51 receives from the variable-length-decoding unit 11 the quantized DCT coefficients and information necessary to determine coordinates of the quantized DCT coefficients. Also, the selector 51 receives an input which holds a zero value at all times. Based on the coordinates of a given quantized DCT coefficient, the selector 51 selects either the zero input or the given quantized DCT coefficient, and outputs the selected value to the inverse-quantization unit 12. In this manner, a check is made as to whether the given DCT coefficient is one of high-frequency components or one of low-frequency components, based on the coordinates of the given DCT coefficient, and, then, the zero value is selected to replace the given DCT coefficient when this coefficient is one of the high-frequency components, thereby cutting this high-frequency component.

The inverse-quantization unit 12 receives the quantized DCT coefficients, and applies inverse quantization to output DCT coefficients. The inverse-DCT unit 13 receives the DCT coefficients, and applies inverse DCT to convert the image information from the frequency domain to the spatial domain.

Coding on the sender side and decoding (image reconstruction) on the receiver side are carried out for each block of an image after dividing the image into a plurality of macro blocks each having 16×16 pixels. Motion vectors between images are also obtained for each macro block. Each macro block is further divided into smaller blocks of 8×8 pixels, and DCT on the sender side and inverse DCT on the receiver side are applied to each one of these smaller blocks.

Figure 4:
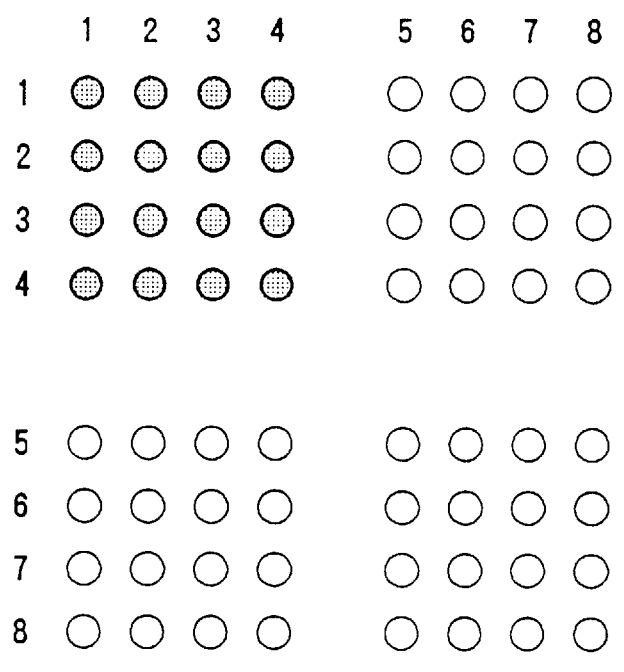

FIG. 4 is an illustrative drawing showing an example of quantized DCT coefficients some of which are replaced by zero values. Each circle in FIG. 4 represents one of the quantized DCT coefficients which are provided in a 8×8 formation corresponding to one image block of 8×8 pixels. In the example of FIG. 4, the quantized DCT coefficient at coordinates (1, 1) corresponds to a direct current component. The farther from this position, the higher frequency component a given quantized DCT coefficient represents. For example, a quantized DCT coefficient at coordinates (1, 8) corresponds to the lowest horizontal frequency component and the highest vertical frequency component. A quantized DCT coefficient at coordinates (8, 1), on the other hand, corresponds to the highest horizontal frequency component and the lowest vertical frequency component.

In FIG. 4, quantized DCT coefficients indicated by solid circles have both a horizontal coordinate and a vertical coordinate less than or equal to four, and quantized DCT coefficients indicated by open circles have either one of the horizontal coordinate or the vertical coordinate larger than four. By replacing the quantized DCT coefficients indicated by open circles with zero values in the selector 51, frequency components higher than a predetermined frequency can be set to zero. This prevents aliasing noise when a size-reduced image is generated by decimating pixels of an image after converting the image into the spatial domain through the inverse DCT. In the example of FIG. 4, the pixel decimation at a rate of one in every two can be conducted without creating aliasing noise.

The MPEG-digital-image compression produces I pictures of intra-frame coding as well as P pictures and B pictures of inter-frame coding, as previously described. When high-frequency components are cut from an image as shown in FIG. 4, the P pictures and the B pictures may suffer from noise. This is because when images are coded based on motion vectors, cutting high-frequency components containing motion information will result in P pictures and B pictures being reconstructed with errors. In order to avoid this in the present invention, only the I pictures are subjected to the image reconstruction and the size reduction.

With reference back to FIG. 3, the variable-length-decoding unit 11 receives a mode signal which indicates whether pictures are displayed in a normal display mode or are reduced in size to be displayed in a multi-window-display mode. With the mode signal indicating the multi-window-display mode, the variable-length-decoding unit 11 converts only I pictures from variable-length codes to fixed-length codes among pictures contained in the data stream from the VBV buffer 17-1, and extracts the motion vectors, the quantized DCT coefficients, etc. Among the pictures contained in the data stream, those other than the I pictures are disposed of. As previously described, identification of I/P/B pictures can be made by the variable-length-decoding unit 11 extracting picture headers from the data stream and looking into the following portions of the data stream. With the mode signal indicating the normal display mode, the variable-length-decoding unit 11 carries out a normal operation with all the I/P/B pictures being subjected to the decoding process.

In the case of the multi-window-display mode, the I pictures passing through the adder 14 are supplied to a decimating circuit 52. The decimating circuit 52 decimates pixels of the images at a predetermined decimation rate to generate size-reduced images. The decimation rate depends on the predetermined frequency which is used by the selector 51 when it replaces frequency components higher than this predetermined frequency with zero values. Relations between the decimation rate and the predetermined frequency are derived from the well-known sampling theory, and it is preferable to decimate pixels such that no aliasing noise is resulted. The decimation rate can be changed within a range which does not bring about the aliasing noise. This range may change in reducing aliasing noise.

The generated size-reduced images are stored at predetermined positions in the MPEG-decoding-purpose memory 17 via the bus 30 and the memory controller 16. Since the present invention displays only I pictures in the multi-window-display mode, a past reference frame and a future reference frame required for reconstruction of P pictures and B pictures are not needed and stored in the MPEG-decoding-purpose memory 17. Resulting free memory space in the I/P-picture buffer 17-2, the I/P-picture buffer 17-3, and the B-picture buffer 17-4 of the MPEG-decoding-purpose memory 17 can be used for storing a plurality of size-reduced images arranged for multi-window-display purposes. Since these size-reduced images are decimated images, a memory capacity required for storing one image is much smaller than that required for a normal size image.

The image information representing a plurality of pictures for multi-window display and stored in the predetermined area of the MPEG-decoding-purpose memory 17 is supplied to the output circuit 18 via the memory controller 16 and the bus 30. The image information supplied to the output circuit 18 is displayed on display 19. In this manner, a plurality of size-reduced pictures can be shown simultaneously on the same display. It is apparent that only one size-reduced image rather than a plurality of them may be displayed.

Operations of the image processing device of FIG. 3 in the case of the normal display mode are almost the same as operations of the MPEG-decoding unit of FIG. 1, and a description thereof will be omitted. The only differences are that the selector 51 does not cut high-frequency components in the case of the normal display mode, and the decimating circuit 52 does not decimate pixels in the case of the normal display mode. Switching of operations between the different modes is initiated by the mode signal supplied to the selector 51 and the decimating circuit 52, with this mode signal indicating either one of the multi-window display mode or the normal display mode. An exemplary configuration for setting this mode signal is that an MPU (not shown) or the like creates this mode signal. Such an MPU is typically provided for controlling overall signal processing in an image processing device when the image processing device carries out signal processing on the MPEG data stream including video signals and audio signals.

As described above, the present invention draws on the fact that the MPEG data stream is transmitted in a form of frequency components, and replaces some of the quantized DCT coefficients with zero values in the frequency domain prior to the conversion to the spatial domain, thereby achieving an efficient suppression of the high-frequency components. Since free memory space of the MPEG-decoding-purpose memory 17 is used for storing size-reduced images, an efficient use of the memories can be made, which results in no need for an additional frame memory for storing multi-window pictures.

This embodiment has been described by using an example in which the selector 51 is placed between the variable-length-decoding unit 11 and the inverse-quantization unit 12. The present invention, however, is not limited to this configuration. For example, the selector 51 may be positioned between the inverse-quantization unit 12 and the inverse-DCT unit 13 to turn selected DCT coefficients into zero. The position of the selector 51 can be anywhere as long as it is positioned at a stage where the image information remains in the frequency domain before conversion to the spatial domain. Further, it is apparent that selected coefficients may be suppressed to be sufficiently small values or values which gradually approach zero, rather than being replaced with zero values.

Figure 5:
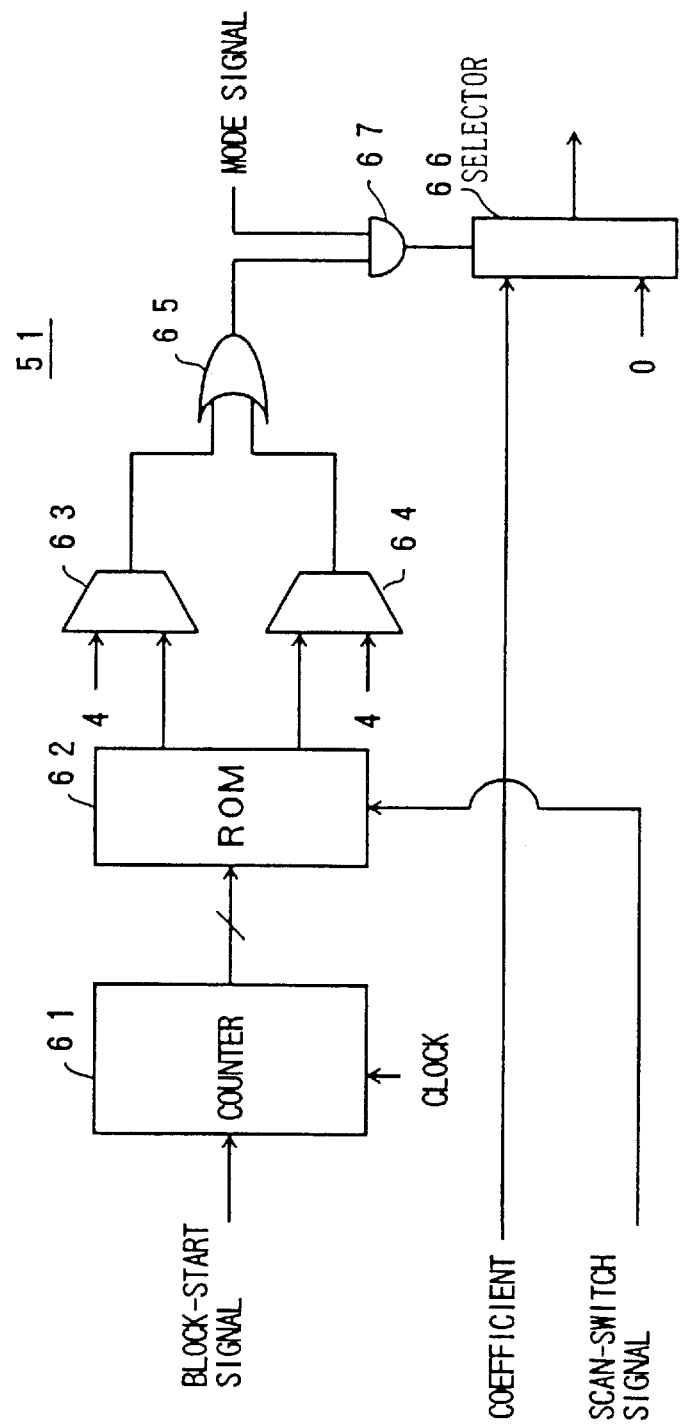
FIG. 5 is a block diagram of an example of the selector of FIG. 3.

FIG. 5 is a block diagram of an example of the selector 51. The selector 51 of FIG. 5 includes a counter 61 for counting numbers up to 64, a ROM 62, comparators 63 and 64, an OR circuit 65, a selector 66, and an AND circuit 67. The counter 61 receives a block-start signal from the variable-length-decoding unit 11, and uses this signal for determining coordinates of the quantized DCT coefficients. The block-start signal indicates a start of each block including 64 quantized DCT coefficients, and is detected by the variable-length-decoding unit 11 from the MPEG data stream. With the block-start signal as a start timing, 64 quantized DCT coefficients are supplied to the selector 66 from the variable-length-decoding unit 11.

The counter 61 is triggered by the block-start signal to count the number of clock pulses which are provided in synchronism with the arrival of the quantized DCT coefficients. The ROM 62 stores information in a table form indicating which one in the sequence of the quantized DCT coefficients corresponds to which position (coordinates) in the 8×8 matrix. The ROM 62 reads a vertical coordinate and a horizontal coordinate of a current quantized DCT coefficient from the table based on the count number provided from the counter 61, and supplies these coordinates to the comparators 63 and 64.

The ROM 62 also receives a scan-switch signal from the variable-length-decoding unit 11. In MPEG, an order in which the quantized DCT coefficients are coded, i.e., an order in which the variable-length-decoding unit 11 provides the quantized DCT coefficients, can be switched between two different scanning orders. This scan-switch signal is used for this purpose.

Figure 6A:
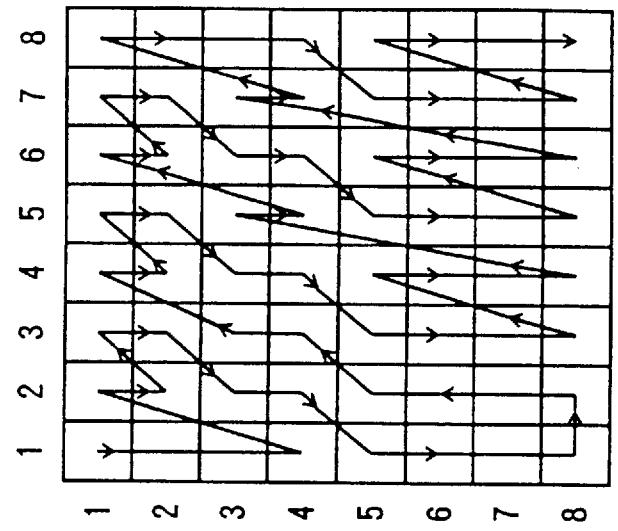
FIGS. 6A and 6B are illustrative drawings showing two different scan schemes.
Figure 6B:
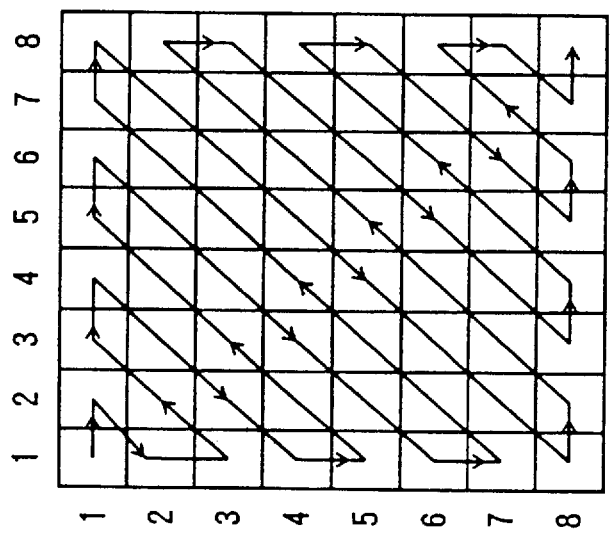

FIGS. 6A and 6B are illustrative drawings showing two different scan schemes. FIG. 6A shows a zigzag scan, and FIG. 6B shows an alternate scan. The zigzag scan starts a zigzag-shaped scan from the direct current component at coordinates (1, 1). The alternate scan also starts from the direct current component, but takes different paths as shown in FIG. 6B. The alternate scan is suitable for coding moving pictures with rapid and volatile movements. Since there are two different scan schemes as shown in FIGS. 6A and 6B, the scan-switch signal is used for indicating which scan scheme is being currently used. The ROM 62 stores two tables corresponding to the two different scan schemes, and uses a table of a scan scheme indicated by the scan-switch signal to read coordinates of the current quantized DCT coefficient.

Each of the comparators 63 and 64 compares a supplied coordinate of the current quantized DCT coefficient with a predetermined value (the value being 4 in FIG. 5). When the supplied coordinate is larger than the predetermined value, the comparators 63 and 64 provide outputs to the OR circuit 65. The OR circuit 65 thus produces a high output when the current quantized DCT coefficient corresponds to one of the open circles of FIG. 4, and generates a low output when the current quantized DCT coefficient corresponds to one of the solid circles. The output of the OR circuit 65 is supplied to the selector 66 via the AND circuit 67. An input of the AND circuit 67 not receiving the output of the OR circuit 65 is supplied with the mode signal, which becomes high when the multi-window display mode is used. In the case of the multi-window display mode, the selector 66 selects a zero input when the output of the OR circuit 65 is high, and selects the current quantized DCT coefficient when the output of the OR circuit 65 is low. In the case of the normal display mode, the selector 66 selects the current quantized DCT coefficient at all times.

In this manner, the selector 51 replaces the quantized DCT coefficients with zero values when the quantized DCT coefficients are those of high-frequency components, thereby cutting these high-frequency components. The configuration of the selector 51 shown in FIG. 5 is provided only for explanatory purposes, and is not intended to limit the scope of the present invention. Any one of various circuit configurations may be used for the selector 51.

Figure 7:
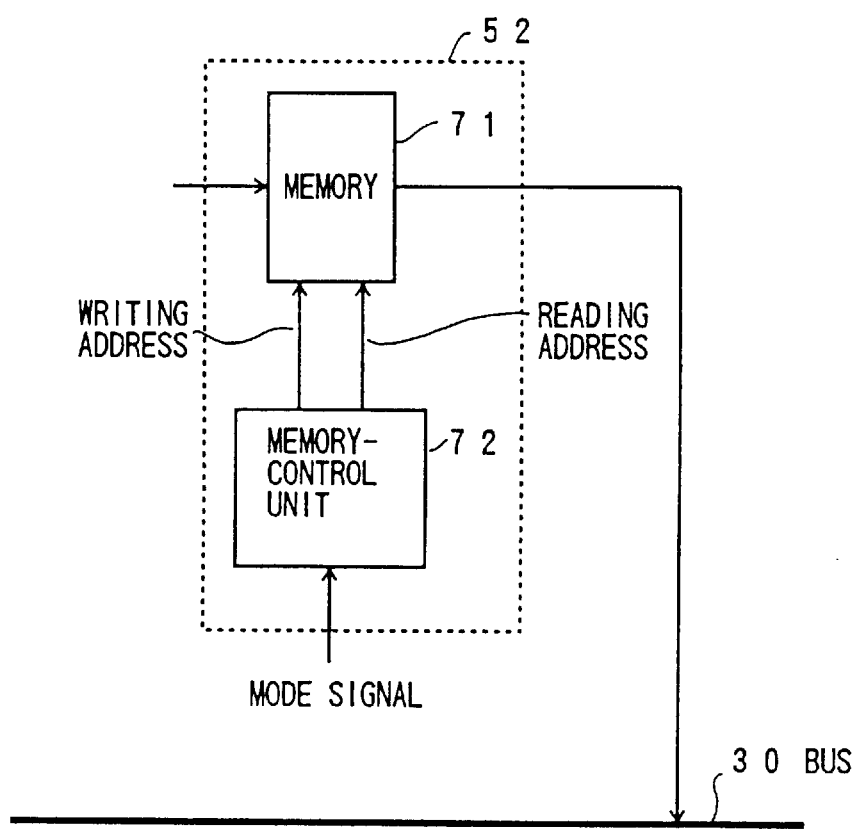
FIG. 7 is a block diagram of an example of the decimating circuit of FIG. 3.

FIG. 7 is a block diagram of an example of the decimating circuit 52. The decimating circuit 52 of FIG. 7 includes a memory 71 and a memory-control unit 72. The memory 71 is comprised of a frame memory with a storage capacity of one frame so as to store a reconstructed I picture at its full size.

Various configurations can be envisaged for implementing the function of pixel decimation. For example, the memory-control unit 72 supplies consecutive addresses as writing addresses to the memory 71, so that an I picture provided from the adder 14 is written into the memory 71 with consecutive pixels stored at consecutive addresses. When reading the I picture from the memory 71, the memory-control unit 72 provides the memory 71 with every other address in a horizontal direction and in a vertical direction as reading addresses, so that the I picture is read from the memory 71 while pixels thereof are decimated. A size-reduced I picture is thus obtained.

Alternately, the I picture is written into the memory 71 while pixels thereof are disposed of at every other pixel position, and remaining pixels are stored at consecutive addresses of the memory 71. In this case, the I picture stored in the memory 71 is already decimated. The memory-control unit 72 thus provides consecutive addresses as reading addresses to the memory 71 to read the size-reduced I picture from the memory 71.

The mode signal provided to the memory-control unit 72 controls the memory-control unit 72 to decimate pixels only when the mode signal indicates the multi-window display mode.

Although the above description has been provided with reference to the MPEG-digital-compression techniques, it is apparent that the present invention is not limited to use in the MPEG-digital compression. The present invention is applicable to any digital compression technique, as long as the technique compresses image data in a form of frequency components.

Further, intra-frame coding and inter-frame coding are not techniques dedicated for use in MPEG, but are employed by various coding schemes. The feature of using only I pictures when decimating and displaying images in the present invention is thus also applicable to any coding technique within the scope of the present invention as long as the coding technique employs intra-frame coding and inter-frame coding.

Further, the present invention is not limited to these embodiments, but various variations and modifications may be made without departing from the scope of the present invention.

What is claimed is:

1. An image processing device which receives digital image data compressed in a form based on frequency components and applies signal processing to said digital image data, said processing device comprising:
   a frequency-component extracting unit extracting said frequency components of intra-frame coding pictures and inter-frame coding pictures from said digital image data when in a first mode, and said frequency components of said intra-frame coding pictures from said digital image data when in a second mode, said frequency components being compressed in a form based on said frequency components;
   a high-frequency suppressing unit suppressing said frequency components if said frequency components are higher than a predetermined frequency;
   a transformation unit transforming said digital image data from a frequency domain into a spatial domain to produce spatial-domain images; and
   a decimating unit decimating pixels of said spatial-domain images only when in said second mode at a predetermined decimation rate to generate size-reduced images.

2. The image processing device as claimed in claim 1, further comprising a memory unit, wherein said memory unit comprises:
   a buffer area for temporarily storing said digital image data before said digital image data is supplied to said frequency-component extracting unit; and
   a picture area for storing said intra-frame coding pictures and said inter-frame coding pictures transformed into said spatial domain when said first mode is indicated, said picture area storing said size-reduced images when said second mode is indicated.

3. The image processing device as claimed in claim 2, further comprising an output unit reading said size-reduced images from said picture area to output a video signal for display of said size-reduced images.

4. The image processing device as claimed in claim 3, wherein said video signal comprises a video signal for displaying a plurality of said size-reduced images simultaneously on the same display.

5. The image processing device as claimed in claim 1, wherein said high-frequency suppressing unit replaces said frequency components with zero values if said frequency components are higher than said predetermined frequency.

6. The image processing device as claimed in claim 1, wherein said predetermined decimation rate is dependent on said predetermined frequency.

7. The image processing device as claimed in claim 1, wherein said digital image data comprises MPEG-digitally-compressed image data.

8. A method of generating size-reduced images in an image processing device which receives digital image data compressed in a form based on frequency components and applies signal processing to said digital image data, said method comprising the steps of:
   extracting said frequency components of intra-frame coding pictures and inter-frame coding pictures from said digital image data when in a first mode, and extracting said frequency components of said intra-frame coding pictures from said digital image data when in a second mode, said frequency components being compressed in a form based on said frequency components;
   suppressing said frequency components if said frequency components are higher than a predetermined frequency only when in said second mode;
   transforming said digital image data from a frequency domain to a spatial domain to produce spatial-domain images;
   decimating pixels of said spatial-domain images at a predetermined decimation rate to generate size-reduced images only when in said second mode.

9. The method as claimed in claim 8, further comprising the steps of:
   temporarily storing said digital image data in a buffer area of a memory unit of said image processing device before extracting said frequency components from said digital image data;
   storing said intra-frame coding pictures and said inter-frame coding pictures transformed into said spatial domain in a picture area of said memory unit when said first mode is indicated; and
   storing said size-reduced images in said picture area of said memory unit when said second mode is indicated.

10. The method as claimed in claim 9, further comprising a step of reading said size-reduced images from said picture area of said memory unit to output a video signal for display of said size-reduced images. reduced images.

11. The method as claimed in claim 10, wherein said video signal comprises a video signal for displaying a plurality of said size-reduced images simultaneously in the same display.

12. The method as claimed in claim 8, wherein said suppressing step comprising a step of replacing said frequency components with one of zero values, substantially zero values, and values which gradually approach zero if said frequency components are higher than a predetermined frequency.

13. The method as claimed in claim 8, wherein said predetermined decimation rate is dependent on said predetermined frequency.

14. The method as claimed in claim 8, wherein said digital image data comprises MPEG-digitally-compressed image data.

* * * * *

UNITED STATES PATENT AND TRADEMARK OFFICE
CERTIFICATE OF CORRECTION

PATENT NO. : 5,867,219
DATED : February 2, 1999
INVENTOR(S) : Kiyoshi KOHIYAMA

It is certified that error appears in the above-identified patent and that said Letters Patent is hereby corrected as shown below:

Col. 12, line 49, delete "reduced images." (second occurrence)

Signed and Sealed this

Sixth Day of July, 1999

Attest:

Q. TODD DICKINSON

*Attesting Officer*    Acting Commissioner of Patents and Trademarks